Jan. 3, 1939.                L. H. MUELLER                2,142,404
                         INTERLOCKING BRICK STRUCTURE
                            Filed May 17, 1938           4 Sheets-Sheet 1

Inventor
LOUIS H. MUELLER,
By Arthur P. Knight and
Alfred W. Knight       Attorneys Jan. 3, 1939.   L. H. MUELLER   2,142,404
INTERLOCKING BRICK STRUCTURE
Filed May 17, 1938   4 Sheets-Sheet 2

Inventor
LOUIS H. MUELLER,
By
Attorneys

Jan. 3, 1939. L. H. MUELLER 2,142,404
INTERLOCKING BRICK STRUCTURE
Filed May 17, 1938 4 Sheets-Sheet 3
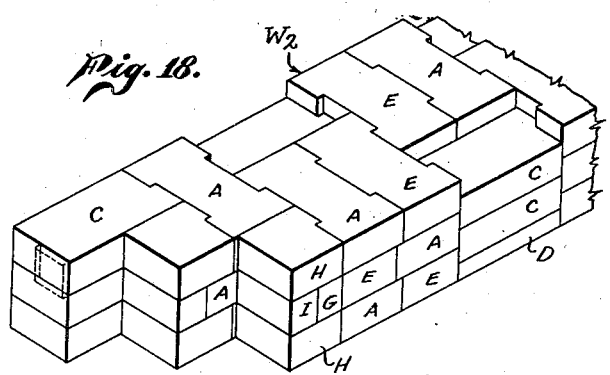
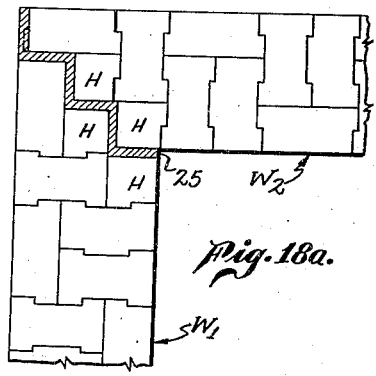
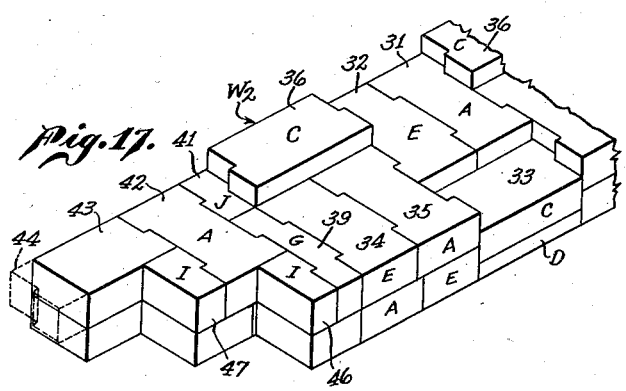
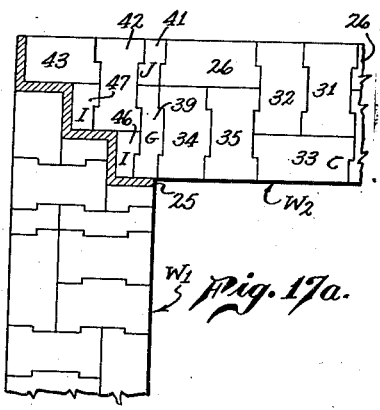
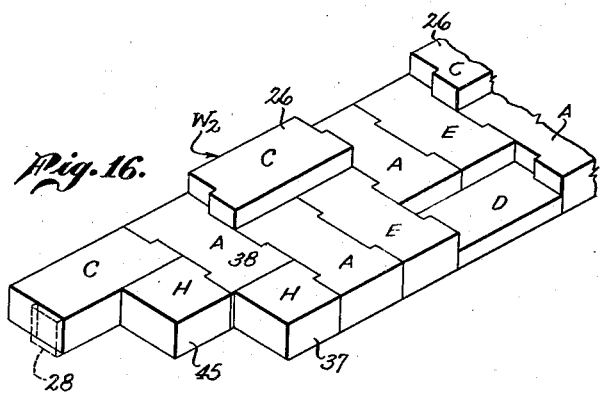
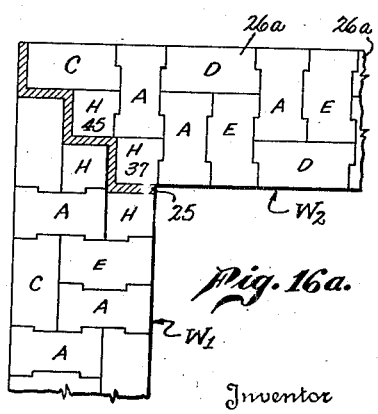
Inventor
LOUIS H. MUELLER,
By Arthur P. Knight and
Alfred W. Knight
Attorneys Jan. 3, 1939.     L. H. MUELLER     2,142,404
INTERLOCKING BRICK STRUCTURE
Filed May 17, 1938     4 Sheets-Sheet 4

Inventor
LOUIS H. MUELLER,
By Arthur P. Knight and
Alfred W. Knight
Attorneys

Patented Jan. 3, 1939

2,142,404

UNITED STATES PATENT OFFICE 2,142,404

INTERLOCKING BRICK STRUCTURE

Louis H. Mueller, San Gabriel, Calif., assignor to Vitrefrax Corporation, Vernon, Calif., a corporation of California Application May 17, 1938, Serial No. 208,390

7 Claims. (Cl. 72—102)

This invention relates to brickwork construction and relates more particularly to wall structures formed of a plurality of bricks provided with complemental interengaging elements adapted to provide an integralized composite structure.

One of the particular objects of the invention is to provide a brickwork construction which is particularly advantageous in the formation of furnace walls and the like, in which the individual brick shapes which make up the wall structure are provided with complemental elements which interengage to cause the respective members to interlock with one another, independent of the use of mortar or the like.

A further object of the invention is to provide a brickwork construction in which the individual bricks are disposed in superimposed layers or "courses", the individual bricks of a particular course being interlocked with one another and with the bricks of the adjacent courses, wherefore the several adjacent courses are interlocked with one another in an integralization of the structure.

A further object of the invention is to provide a brickwork construction in which a portion of the structure is provided with the above-mentioned interlock between adjacent courses, and in the remainder of the structure the bricks are arranged to provide a staggering of the vertical joints between the brick so that the bricks of one course are at least in part overlapped by a plurality of bricks in an adjacent course.

A further object of the invention is to provide a brickwork construction of the interlocking type, in which the joints between brick which extend in the direction of heat flow through the brick body are caused to be at least partially staggered, whereby an important resistance to heat loss through the joints is obtained, without sacrifice of structural strength, a feature which is of particular importance in the use of brickwork construction in the formation of furnace walls and the like.

The term "wall", as used herein, is intended to designate a wall structure in a rather broad sense, in that the structures are not restricted to vertical or vertically extending structures, but are equally applicable to floor structures or the like.

It is well known that in the construction of furnaces, and in particular the refractory lining portions of such furnaces as are subjected to high temperature conditions, there is a tendency for the wall structures to buckle, owing to distortions produced by unequal thermal expansion resulting from unequal distribution of heat through the brickwork body. This buckling or distortion frequently results in the development of large cracks or fissures in the refractory structure so that heat loss and the effects of flame erosion become serious.

Constructions have heretofore been suggested in which the individual bricks of a course are interlocked with one another by a mechanical bond which is independent of any mortar which may be employed, as are disclosed in U. S. Patent No. 1,606,150 to T. S. Curtis. The present invention is contemplated to provide the advantageous features suggested in the above-mentioned patent, in connection with the added features of providing a course interlock in which certain brick in each course are offset with respect to the brick in the remainder of the course in a direction transverse to the plane of the course, and a staggering of the joints between adjacent brick in successive courses in connection with an advantageous method of providing a transition between the course-interlocked portion of a brick structure and the portion provided with the aforesaid joint-stagger. The interlock obtained between complemental interlocking members on the respective brick elements in each case serves to position the brick elements with respect to one another against relative displacement transverse to the plane of the wall in which the construction is embodied.

The brick shapes employed in the present structures may be, for the most part, comparable to the shapes disclosed in the above-mentioned Curtis patent, together with additional shapes which provide the principal features of the present invention.

The brickwork construction of the present invention comprises, essentially, a plurality of brick elements arranged in successive courses, the brick elements within the respective courses being mechanically interlocked with one another through the agency of complemental interlocking members provided on the brick elements themselves, and a plurality of brick elements located at a level intermediate successive courses and having portions extending into the respective adjacent courses, such last-named brick elements being offset from the adjacent brick elements in a particular course in a direction transverse to the plane of the course to provide such extension into the adjacent courses. According to this construction, each course is provided with a plurality of bricks which are transversely offset with respect to the remaining bricks in such course, and at sufficiently close intervals to provide an adequate interbond between the successive courses throughout the wall structure, such transversely offset bricks serving to mechanically interlock with the bricks of an adjacent course.

The invention further comprises the provision of certain brick elements in a joint-staggered relation in close proximity to the position of the course-interlocking brick elements aforementioned, through the agency of brick elements of reduced dimension in the plane of the course in which such last-named elements are disposed, in cooperation with brick elements of standard dimensions in the adjacent courses, to secure an overlap in the direction of the courses.

Other objects of the invention will be brought out in the ensuing description, or will be apparent therefrom. Certain embodiments of the invention are illustrated in the accompanying drawings, and referring thereto:

Figure 19:
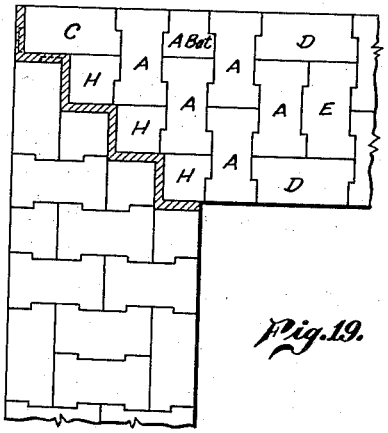
Figure 20:
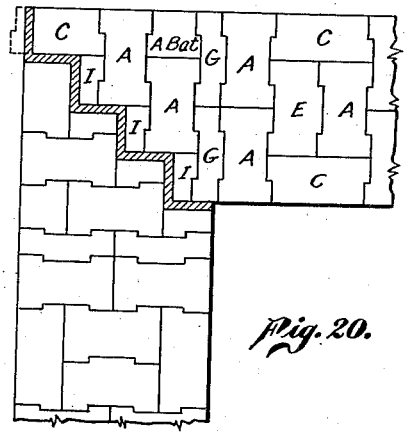
Figure 21:
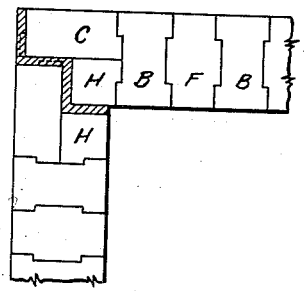
Figure 22:
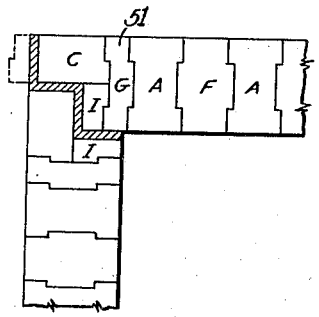

Figs. 16, 17 and 18, and Figs. 16a, 17a and 18a show, in isometric and plan views, respectively, the progressive construction of a 13½-inch wall terminating in a corner construction adapted to meet with a comparable or mating corner construction to provide an expansion joint, utilizing various brick shapes to provide an interlock between successive courses in a portion of the wall construction, and certain other brick shapes to provide a joint-staggering at the position of the bricks in another portion of the wall structure, wherefore a certain degree of overlap of the bricks in successive courses is obtained where desired, immediately adjacent the course-interlocked portion of the structure;

Figs. 19 and 20 show alternate courses in an 18-inch wall construction providing an expansion joint at the juncture of two meeting walls; and Figs. 21 and 22 are corresponding views showing a 9-inch wall construction.

In accordance with conventional terminology, where the terms "bat", "soap", and "split" are used herein, they will be understood to have the same significance as in ordinary brickwork, and these expressions will be employed primarily to provide a rough description of a brick shape, to facilitate an understanding of the disclosure. For the purpose of clarity, the basic shapes shown in Figs. 1 through 10 will be hereinafter referred to by the reference characters A through J, and will be so identified in the several drawings.

For the purpose of description, the herein described brick shapes are considered to conform to standard "fire brick" dimensions, which will lay up in a wall construction to provide the same over-all dimensions as that provided by the conventional 2½x4½x9 inch fire brick shapes. These dimensions are given by way of example only, as will be apparent to one skilled in the art, inasmuch as the shapes may be made in any other dimensions or any multiple of these dimensions to provide a particular construction. It will be comprehended that there is no essential reason for restricting the dimensions of the present brick shapes to the standard fire brick dimensions, and in the ensuing description, wherever a comparison is made between the shape or dimensions of one of the present brick shapes and a "conventional" brick shape, it will be understood that the comparison is made from the standpoint of the total volume of the brick shape, as an indication that the brick shape will lay up in a wall construction with the same dimensional characteristics as such a "conventional" brick shape.

The brick shapes themselves actually depart from the 2½x4½x9 inch dimensions in some respects, due to the provision of tongue and groove or male and female dovetailing elements, which constitute the complemental interlocking members above mentioned, but it will be appreciated that the brick shapes may be provided in any desired relation of dimensions, according to the specific construction requirements at hand in a particular installation. Furthermore, the brick shapes also depart from the conventional dimensions above stated in being so proportioned as to allow a space for mortar between bricks when the bricks are laid up in a wall. While the brick shapes actually depart from the conventional dimensions of a fire brick by virtue of the provision of the complemental interlocking or dovetailing elements, the recesses and projections on the individual bricks are also complementary to the extent that the effective volume of the brick when laid up is the same as though it were of conventional outline, wherefore a plurality of the bricks will lay up equivalently to the conventional bricks. This feature of the invention will be more apparent from the following description of the particular brick shapes themselves, and will be further apparent as the description of the completed construction proceeds.

Figure 1:
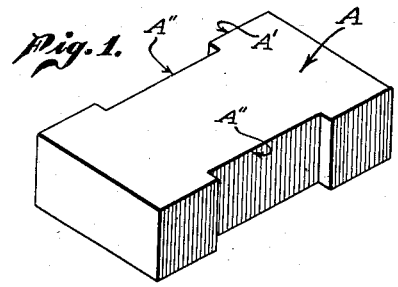
Figs. 1 through 10 illustrate various typical shapes of brick which may be employed to carry out the present invention.
Figure 2:
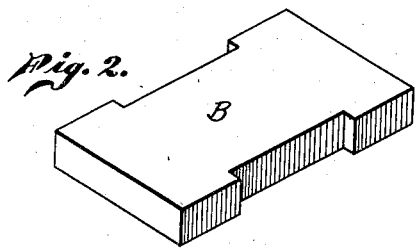
Figure 4:
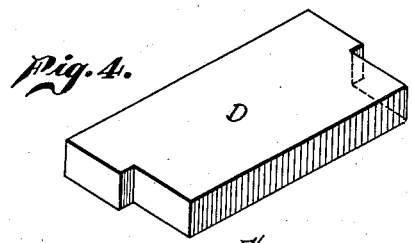

The A-shape shown in Fig. 1 comprises an I shaped brick, corresponding to that shown in Fig. 1 of the above-mentioned Curtis patent. This brick is provided with enlarged end portions defining shoulders A' with a recessed medial portion A". The shape shown in Fig. 2 is identical in outline with the A-shape, but of one-half thickness, thus constituting, in effect, an A-split. This shape is referred to as the B-shape.

Figure 3:
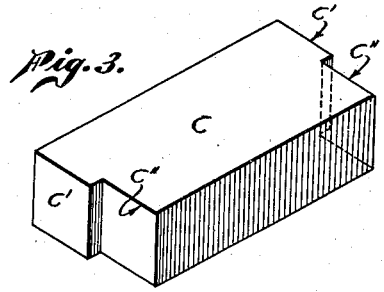

The C-shape shown in Fig. 3 is customarily employed as a "stretcher" and is recessed at its corners along one side, as at C", to provide shoulders C' at the other side of the brick. The D-shape shown in Fig. 4 corresponds to a C-split, after the manner of the B form shown in Fig. 2, and is essentially a C-shape of one-half thickness.

Figure 5:
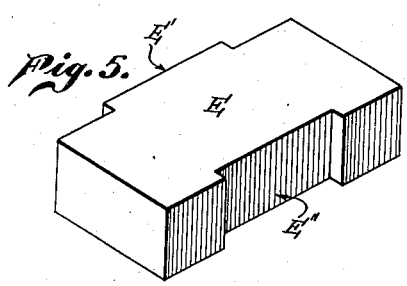

The E-shape shown in Fig. 5 is formed with one edge E' adapted to mate with an edge of an A-shape, the other edge E" being similar to an edge of the A-shape. This shape is conventionally employed as a "header", as in mating relation with an A-form.

Figure 6:
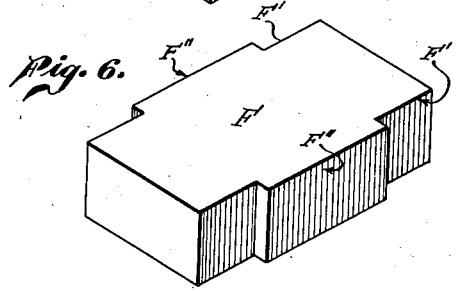

The F-shape shown in Fig. 6 is substantially the inverse of the A-shape, and is provided with edges F' which are adapted to mate with the edges of the A-shape, the shoulders F" being adapted to enter the recesses of the recessed medial portion A" of the A-shape.

Figure 7:
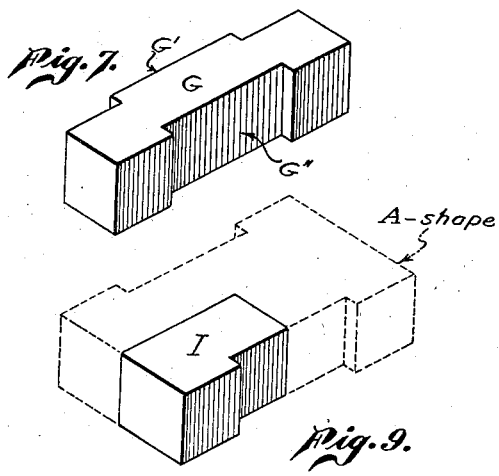

The G-shape shown in Fig. 7 can be considered as comprising an E-soap, in that it is of one-half width, and is provided with one edge G' comparable to the edge E', and the other edge G" comparable to the edge E". This form is employed in mating relation to either A or E shapes, in providing the transition between the course-interlocking construction and the joint-staggering construction of the present invention.

Figure 8:
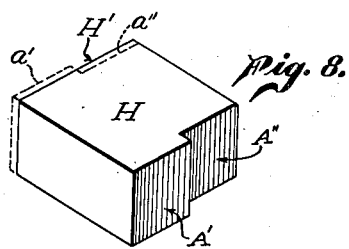

The H-shape shown in Fig. 8 may roughly be described as an A-bat, with one shoulder A' clipped off. More strictly, the H-shape corresponds to the shape which would be produced by clipping off one-half of one shoulder A', as at a', and fitting it into the adjacent portion of the recess A", as at a", making a straight line of the edge H'. This shape, as is the I-shape shown in Fig. 9, is employed to finish off corner portions of a wall structure, particularly in "stepped" wall constructions as are shown in Figs. 16–22, to secure an even dimension.

Figure 9:
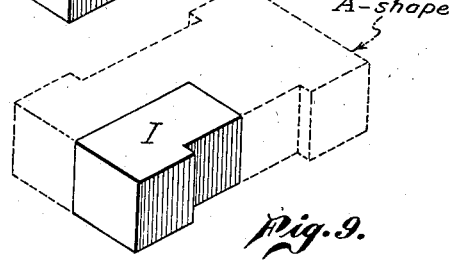

The I-shape shown in Fig. 9 comprises, essentially, a quarter of an A-shape, the width of the shape along the near edge and the length of the shape each being one-half that of the A-shape. This shape is employed to finish off the end of a wall together with H-shapes, in alternate courses, where a joint-staggered construction is employed.

Figure 10:
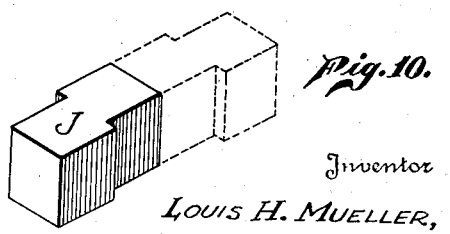

The J-shape shown in Fig. 10 is essentially a G-bat, and is employed in connection with the G-shape to secure the transition from the course-interlock construction to the joint-staggered construction in, for example, a 13½-inch or 23½-inch wall.

Figure 11:
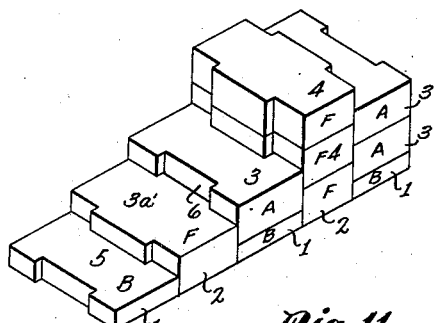
Figs. 11 and 12 illustrate, respectively, 9-inch and 13½-inch wall constructions which may employ shapes of the type shown in Fig. 2 as a means of providing the transverse offsetting of certain bricks in successive courses.

Referring to Fig. 11, a 9-inch wall construction is provided according to the present invention by laying a bottom or starting course of alternate B- and F-shapes, designated at 1 and 2, respectively, both arranged as headers. A-shapes and additional F-shapes 3 and 4 are superimposed upon the shapes 1 and 2, respectively, in laying the successive courses. In this construction, the B- and F-shapes in the starting course are vertically (transversely) offset with respect to one another, wherefore the F-shapes extend into the next succeeding course between adjacent A-shapes, to provide the desired interlock of the adjacent courses, the actual interlock being secured at the position of the complemental shoulder and recess structures in the edge portions of the bricks.

Throughout the construction, the shoulder portions F'' of the F-shapes will be mated with the recessed portion of the A- and B-shapes, wherefore the course interlock becomes mechanical, and is independent of any mortar or cement which may be employed to lay the brick. The reduced-height bricks, or splits, (the B-shapes) are necessarily employed only in the starting course, and the interlock is carried throughout the height of the wall structure by the use of full-height bricks. The wall may be finished off at the top by using further B-shapes superimposed upon the A-shapes, if desired.

Figure 12:
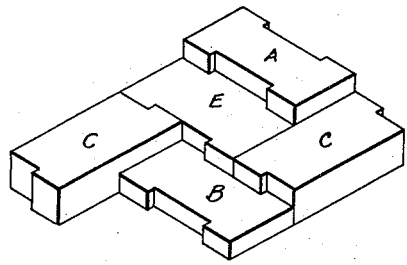

The construction shown in Fig. 12 illustrates the formation of a wall of 13½-inch width in which B-shapes are employed together with C- and E-shapes to provide the starting course, the B-shapes and E-shapes being employed as headers and the C-shapes being employed as stretchers. The construction is built up to the desired extent by the addition of A, C, and E shapes, as will be apparent, and may be finished off by the use of additional B-shapes as above described.

Figure 13:
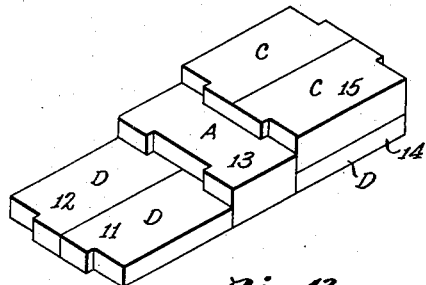
Figs. 13, 14 and 15 illustrate, respectively, 9-inch, 13½-inch and 18-inch walls employing shapes of the type shown in Fig. 4 as a means of providing the transverse offsetting of certain bricks in successive courses.
Figure 14:
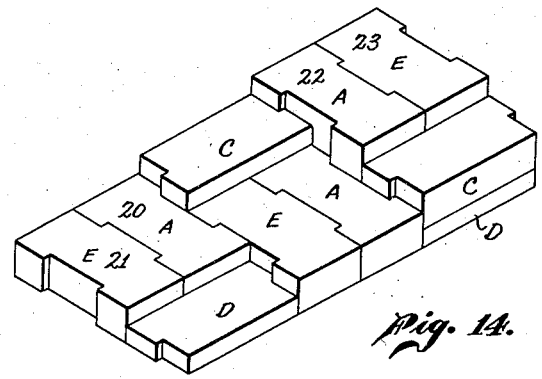
Figure 15:
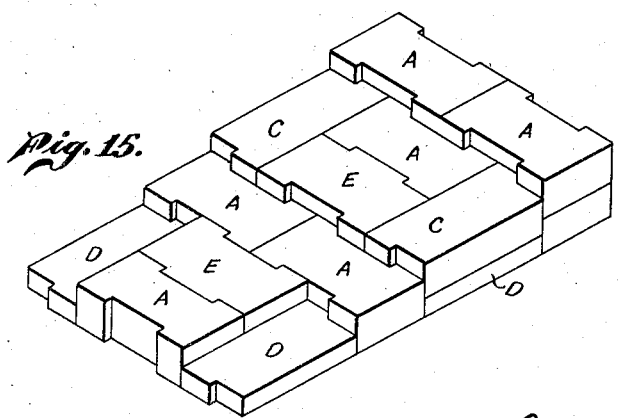

The forms illustrated in Figs. 13 through 15 show the use of D-shapes as stretchers, to secure the desired interlock between adjacent courses, the first course comprising (in Fig. 13) two D-shapes 11 and 12 laid back to back as stretchers, adjacent which an A-shape as a header is placed as at 13. This construction is repeated in successive courses with further D-shapes 14, and the full height C-shapes are superimposed as at 15 over the D-shapes 11, 12 and 14, and full height A-shapes are superimposed upon the A-shape 13 to provide the successive courses. The 13½-inch wall construction illustrated in Fig. 14 is entirely comparable to that shown in Fig. 13, and combines the use of shapes A, C, D, and E. The positions of the A- and E-shapes in successive courses may be relatively reversed, as at 20—21 in a lower course, compared with 22—23 in a succeeding course, to provide additional staggering of the joints. Fig. 15 illustrates an 18-inch wall construction, using the same shapes as are employed in Fig. 14, and it will be appreciated that greater thicknesses of walls may be provided by combinations of the structures illustrated in Figs. 11 to 15.

Figs. 16 through 18, taken with Figs. 16a through 18a, illustrate the progressive growth of a wall construction, carried through three courses of brick. It will be appreciated that the average wall will probably be much greater in height than that provided by three courses, but the present description and showing is simplified to this extent as a matter of convenience. These figures also illustrate the construction of a wall which is adapted to meet another wall to provide an expansion joint at the corner. The lower left-hand end of the construction shown in each of these figures is for this reason shown as "stepped", to provide a zig-zag expansion joint. This zig-zag joint is more clearly illustrated in the plan figures (16a, 17a and 18a), showing the two meeting walls $W_1$ and $W_2$ in plan view, and in which the space 25 between the two meeting walls is indicated as filled with a suitable insulating material, preferably one which has some inherent resilience, such as mineral wool or the like.

Referring to Fig. 16, it will be seen that the lower course is made up primarily of shapes A, C, D, and E, C-shapes 26 of the second course being shown superimposed (Fig. 16) upon the D-shapes 26a (Fig. 16a) of the first course in accordance with the construction shown in Fig. 14. The stepped corner portion is provided by the use of modified shapes H (Fig. 8), the H-shape being so dimensioned as to establish the stepped portion of the wall at one brick-width (4½ inches, for example) in each direction so that the meeting walls will make an expansion joint of uniform thickness. The wall $W_2$ may be finished roughly at the corner by clipping off one projecting shoulder of the corner C-shape, but a more finished construction may be provided by using a modified special shape in the place of the corner C-shape, in which one-half of the projecting shoulder is removed (in a manner comparable to that described in connection with the H-shape shown in Fig. 8) and placed at the position of the recess C'' to provide a straight end surface.

It will be appreciated that where small brick shapes such as the H-shapes are employed, were these shapes to be directly superimposed upon one another so that they would be established in independent columns, there would be a considerable tendency for the columns to separate one from the other and thus contribute to a disintegration of the wall construction under the successive expansion and contraction due to heat changes in use. For this reason I provide for a staggering of the bricks in a lateral direction near the stepped end of the wall. As shown in Figs. 17 and 17a, this staggering is accomplished by the use of a soap form such as that shown at G in Fig. 7.

The second course of the wall shown in Figs. 16 through 18a may therefore be provided by laying an A-shape as at 31 over the E-shape in the lower course, an E-shape as at 32 over the A-shape in the lower course (to provide a partial joint staggering as above described), a C-shape as at 33 over the lower D-shape, E-shape and A-shape 34 and 35 over the A-shape and E-shape in the lower course, and the C-shapes at 26 over the D-shapes 26a as above described, which brings the construction up to the stepped portion of the wall. In Fig. 17 I have illustrated C-shapes 36 of the third course superimposed upon C-shapes 26 of the second course. Fig. 17a correctly shows the second course layout. At this point a G-shape is superimposed upon the far edge of the H-shape 37 and upon the far edge of the A-shape 38 in the lower course, as at 39, and a J-shape is placed in alinement with the G-shape as at 41. The balance of the corner is filled out with an A-shape 42 and a C-shape 43, the end portion of which is clipped off as shown in dotted lines at 44, and the corners over the H-shapes 37 and 45 in the lower course are completed through the agency of I-shapes 46 and 47. It will be comprehended that a special shape may be provided instead of the clipped C-shape at the corner portion of the wall, if desired.

The third course is a substantial repetition of the first course, with the exception that full height shapes (C-shapes) are employed instead of the splits (D-shapes) and if the wall is to be finished off at the third course, additional D-shapes may be superimposed upon the C-shapes as described in connection with Figs. 13–15.

It will be understood that an expansion joint may be provided at a point along the length of a wall, instead of at the juncture of two meeting walls as shown, in which case it will in general be desirable to employ a "stepped" construction of the general type shown, but the actual construction of the expansion joint may be substantially identical to the type of joint herein disclosed.

Figs. 19 and 20, which illustrate the bottom and next to bottom courses, respectively, of an 18-inch wall construction, show constructions which are entirely comparable to the 13½-inch wall construction shown in Figs. 16 through 18a, and utilize the same shapes in substantially the same relation. It will be appreciated that the A-split (B-shape) or the C-split (D-shape) may be used interchangeably or together, in this 18-inch wall construction, after the manner illustrated in Figs. 11 through 15, within the contemplation of the invention.

Figs. 21 and 22 illustrate a 9-inch wall construction of the type shown in Fig. 11, using A-shapes with F-shapes, the lower course being made up of B-shapes upon which the A-shapes are superimposed and F-shapes upon which further F-shapes are superimposed, and the corner being finished out with a C-shape which is clipped off at the end portion in accordance with the showing at 28 in Fig. 16. The next course is provided with the desired joint de-registration through the use of a G-shape as at 51 (in accordance with the showing in Figs. 16 through 18a), and the proper dimensioning of the "step" in the wall is provided by the use of I-shapes 52, in a manner comparable to that shown in Figs. 17 and 17a.

I claim:

1. A brickwork construction comprising a plurality of brick elements arranged in a plurality of courses to form a wall, the brick elements of each course being mechanically interlocked with one another against relative displacement transverse to the plane of the wall through the agency of complemental interlocking members provided on the respective brick elements, each of said courses being provided with brick elements which are offset transversely with respect to the plane of the remaining brick elements in such course and extend into an adjacent course in interlocking engagement therewith.

2. The construction set forth in claim 1, said transversely offset brick elements being located at spaced intervals throughout the respective courses to establish an interlock between adjacent courses adapted to resist stresses applied in the plane of a course.

3. A brickwork construction comprising a plurality of brick elements arranged in a plurality of courses to form a wall, the brick elements of each course being provided with complemental interlocking members and said interlocking members being engaged with one another, to oppose relative displacement of said elements transverse to the plane of the wall, the starting course in said construction comprising a plurality of full-height brick elements and a plurality of reduced-height brick elements interspaced between said full-height brick elements, and the successive courses in said construction comprising full-height brick elements, the brick elements in a successive course which are alined with the position of said reduced-height elements in the starting course being offset transversely with respect to the plane of the remaining elements of the course and having portions extending into an adjacent course in interlocking relation thereto.

4. A brickwork construction comprising a plurality of brick elements arranged in a plurality of successive courses to form a wall, the brick elements of the starting course comprising spaced split brick elements and full-height brick elements, all of said brick elements being provided with complemental interlocking members in engagement with one another to interlock the several brick elements in said course against relative displacement transverse to the plane of the wall, and the successive courses of said construction comprising full-height brick elements interlocked with one another against relative displacement transverse to the plane of the wall through the agency of complemental interlocking members on the respective brick elements and certain of the brick elements of each such successive course being offset transversely with respect to the plane of the remaining brick elements of such course at the position of said split brick elements, wherefore said successive courses are interlocked with each other at spaced intervals throughout said brickwork.

5. A brickwork construction comprising: a plurality of brick elements arranged in a plurality of successive courses to form a wall, the brick elements of each course being mechanically interlocked with one another against relative displacement transverse to the plane of the wall through the agency of complemental interlocking members provided on the respective brick elements; each of said courses in one portion of said construction being provided with brick elements which are offset transversely with respect to the plane of the remaining brick elements in such course and extend into an adjacent course in interlocking engagement therewith; the courses in another and adjacent portion of said construction being provided with brick elements arranged in staggered relation so that the brick elements in one course overlap two adjacent brick in a preceding course; the brick elements of each course in said other portion interlocking with the brick elements of the corresponding course in said one portion at the juncture of said two portions against displacement transverse to the plane of the wall.

6. A brickwork construction comprising: a plurality of brick elements arranged in a plurality of successive courses to form a wall, the brick elements of each course being mechanically interlocked with one another against relative displacement transverse to the plane of the wall through the agency of complemental interlocking members provided on the respective brick elements; each of said courses in one portion of said construction being provided with brick elements which are offset transversely with respect to the plane of the remaining brick elements in such course and extend into an adjacent course in interlocking engagement therewith; the courses in another and adjacent portion of said construction being provided with brick elements arranged in staggered relation so that the brick elements in one course overlap two adjacent brick in a preceding course; at least one brick element in each course in said other portion interlocking against displacement transverse to the plane of said wall with at least one brick element in the corresponding course in said one portion at the juncture of said two portions, and at least one brick element in each course in said other portion interlocking against displacement transverse to the plane of said wall with at least one brick element in the next succeeding course in said one portion at the juncture of said two portions.

7. A brickwork construction comprising: a plurality of brick elements arranged in a plurality of successive courses to form a wall, the brick elements of each course being mechanically interlocked with one another against relative displacement transverse to the plane of the wall through the agency of complemental interlocking members provided on the respective brick elements; each of said courses in one portion of said construction being provided with brick elements which are offset transversely with respect to the plane of the remaining brick elements in such course and extend into an adjacent course in interlocking engagement therewith; the courses in another and adjacent portion of said construction being provided with brick elements arranged in staggered relation so that the brick elements in one course overlap two adjacent brick in a preceding course; at least one brick element in each course in said other portion interlocking against displacement transverse to the plane of said wall with at least one brick element in the corresponding course in said one portion and with at least one brick element in the next succeeding course in said one portion, at the juncture of said two portions.

LOUIS H. MUELLER.